(12) United States Patent
Liang

(10) Patent No.: US 8,595,594 B2
(45) Date of Patent: Nov. 26, 2013

(54) DATA PROCESSING METHOD, MEMORY CONTROLLER, AND MEMORY STORAGE DEVICE

(75) Inventor: Li-Chun Liang, Kaohsiung (TW)

(73) Assignee: Phison Electronics Corp., Miaoli (TW)

( * ) Notice: Subject to any disclaimer, the term of this patent is extended or adjusted under 35 U.S.C. 154(b) by 167 days.

(21) Appl. No.: 13/212,218

(22) Filed: Aug. 18, 2011

(65) Prior Publication Data

US 2013/0019138 A1     Jan. 17, 2013

(30) Foreign Application Priority Data

Jul. 11, 2011 (TW) .............................. 100124443 A

(51) Int. Cl.
*G11C 29/00* (2006.01)
(52) U.S. Cl.
USPC ........................... 714/766; 714/774; 714/767
(58) Field of Classification Search
USPC .................. 714/766, 763, 774, 767, 718
See application file for complete search history.

(56) References Cited

U.S. PATENT DOCUMENTS

| | | | |
|---|---|---|---|
| 6,525,722 B1 * | 2/2003 | Deering | 345/419 |
| 8,228,213 B2 * | 7/2012 | DeCusatis et al. | 341/51 |
| 8,341,501 B2 * | 12/2012 | Franceschini et al. | 714/774 |

* cited by examiner

*Primary Examiner* — Fritz Alphonse
(74) *Attorney, Agent, or Firm* — Jianq Chyun IP Office

(57) ABSTRACT

A data processing method is provided. A data is compressed to obtain a compressed data. Compression information corresponding to the compressed data is obtained. Error checking and correcting (ECC) codes are respectively generated for the compression information and the compressed data. The compression information, the compressed data, and the ECC codes are respectively written into a rewritable non-volatile memory module. The compression information, the compressed data, and the ECC codes are respectively read from the rewritable non-volatile memory module. An ECC procedure is preformed on the compression information according to the corresponding ECC code, so as to obtain a storage state when the compression information is written. An ECC procedure is preformed on the compressed data according to the storage state of the compression information and the ECC code corresponding to the compressed data, so as to obtain a storage state when the compressed data is written.

20 Claims, 8 Drawing Sheets

DATA PROCESSING METHOD, MEMORY CONTROLLER, AND MEMORY STORAGE DEVICE

CROSS-REFERENCE TO RELATED APPLICATION

This application claims the priority benefit of Taiwan application serial no. 100124443, filed on Jul. 11, 2011. The entirety of the above-mentioned patent application is hereby incorporated by reference herein and made a part of this specification.

BACKGROUND OF THE INVENTION

1. Field of the Invention

The invention generally relates to a data processing method, and more particularly, to a data processing method of a memory controller and a memory storage device.

2. Description of Related Art

In the design of a memory storage device, an error checking and correcting (ECC) circuit is usually adopted for verifying the accuracy of data stored in the memory storage device. To be specific, when a host system connected with the memory storage device transmits a data to the memory storage device, the ECC circuit in the memory storage device generates a corresponding ECC code, and a memory management circuit in the memory storage device writes both the data and the ECC code into a rewritable non-volatile memory module of the memory storage device. Subsequently, when the host system is about to read the data from the memory storage device, the memory management circuit reads the data and the corresponding ECC code from the rewritable non-volatile memory module, and the ECC circuit executes an ECC procedure on the data according to the corresponding ECC code to ensure the accuracy of the data.

However, while executing the ECC procedure, regardless of during the encoding process or the decoding process, the ECC circuit needs to know the exact length of the data so as to correctly calculate the characteristic code and determine the error position. However, if the data to be protected is compressed, the data length thereof is not fixed. As a result, the ECC circuit cannot execute the ECC procedure correctly during the decoding process. Thereby, how to let an ECC circuit to execute an ECC procedure correctly during a decoding process of a compressed data, so as to ensure data accuracy, has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

Accordingly, the invention is directed to a data processing method in which an error checking and correcting (ECC) procedure is executed on a compressed data according to compression information of the compressed data, so that the ECC procedure can be effectively executed.

The invention is directed to a memory controller which executes an ECC procedure on a compressed data according to compression information of the compressed data, so that the ECC procedure can be effectively executed.

The invention is directed to a memory storage device in which an ECC procedure is executed on a compressed data according to compression information of the compressed data, so that the ECC procedure can be effectively executed.

The invention provides a data processing method adapted to a rewritable non-volatile memory module. The data processing method includes following steps. At least one data is compressed to obtain at least one compressed data. At least one compression information corresponding to the at least one compressed data is obtained. ECC codes are respectively generated for the at least one compression information and the at least one compressed data. The at least one compression information, the at least one compressed data, and the ECC codes are respectively written into the rewritable non-volatile memory module.

The invention provides a memory controller including a host system interface, a memory interface, a compression and decompression module, an ECC circuit, and a memory management circuit. The host system interface is configured to couple to a host system. The memory interface is configured to couple to a rewritable non-volatile memory module. The compression and decompression module is coupled to the memory management circuit. The compression and decompression module compresses at least one data to obtain at least one compressed data and at least one compression information corresponding to the compressed data. The ECC circuit is coupled to the memory management circuit. The ECC circuit respectively generates ECC codes for the at least one compression information and the at least one compressed data. The memory management circuit is coupled to the host system interface and the memory interface. The memory management circuit writes the at least one compression information, the at least one compressed data, and the ECC codes corresponding to the at least one compression information and the at least one compressed data into the rewritable non-volatile memory module.

The invention provides a memory storage device including a connector, a rewritable non-volatile memory module, and a memory controller. The connector is configured to couple to a host system. The memory controller is coupled to the connector and the rewritable non-volatile memory module. The memory controller compresses at least one data to obtain at least one compressed data and at least one compression information corresponding to the at least one compressed data. The memory controller respectively generates ECC codes for the at least one compression information and the at least one compressed data. The memory controller writes the at least one compression information, the at least one compressed data, and the ECC codes corresponding to the at least one compression information and the at least one compressed data into the rewritable non-volatile memory module.

These and other exemplary embodiments, features, aspects, and advantages of the invention will be described and become more apparent from the detailed description of exemplary embodiments when read in conjunction with accompanying drawings.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
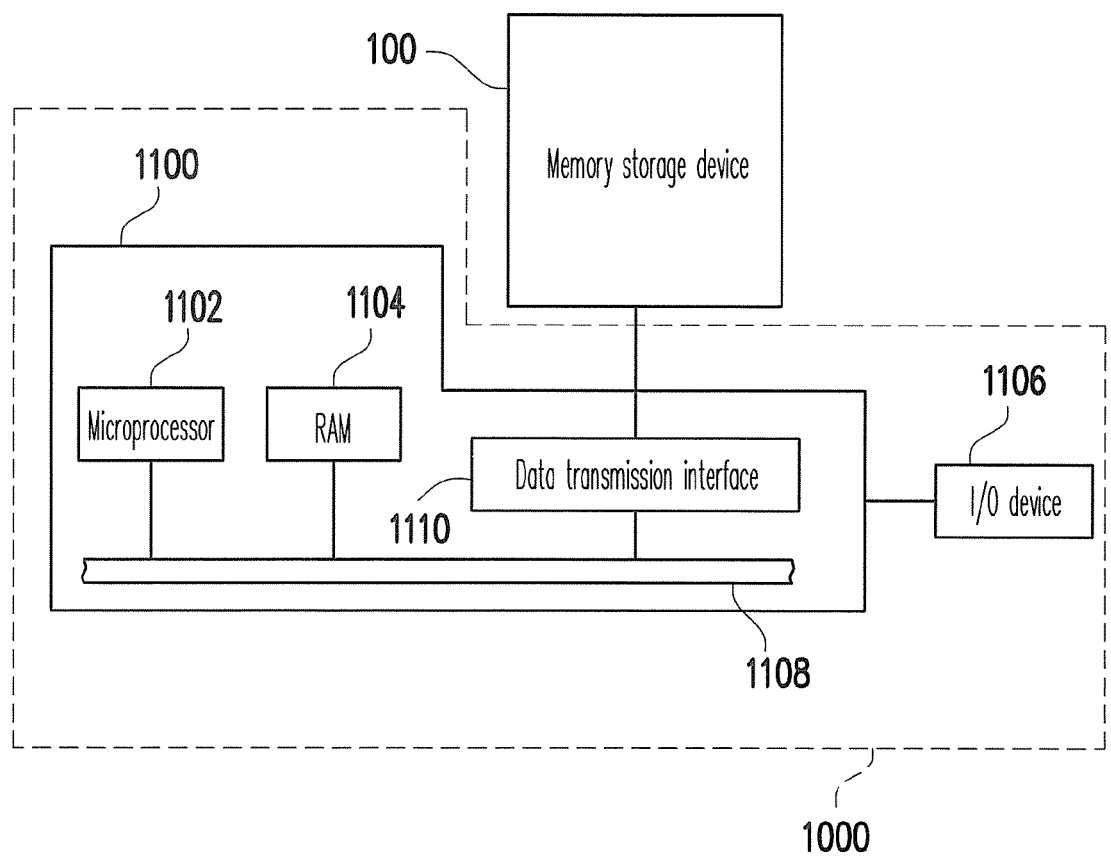
FIG. 1A illustrates a host system using a rewritable non-volatile memory storage device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In order to break the limitation of conventional error checking and correcting (ECC) procedure, an exemplary embodiment of the invention provides a data processing method adapted to a memory storage device having an unconventional data format. In the data processing method, a header corresponding to a data bit area is placed at the beginning of each physical page in a rewritable non-volatile memory module, wherein the header stores compression information corresponding to a data, and the compression information has its own ECC protection and can be decoded independently. Thereby, before reading the data, a memory controller can first read the compression information and then execute an ECC procedure on the data according to the compression information, so as to ensure that the ECC procedure can be effectively executed. In addition, because the compression information comes with its own ECC protection, the accuracy thereof is ensured. Below, exemplary embodiments of the invention will be described in detail with reference to accompanying drawings.

FIG. 1A illustrates a host system using a rewritable non-volatile memory storage device according to an exemplary embodiment of the invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2B. It should be understood that the I/O device 1106 is not limited to the devices illustrated in FIG. 2B and may further include other devices.

Figure 1B:
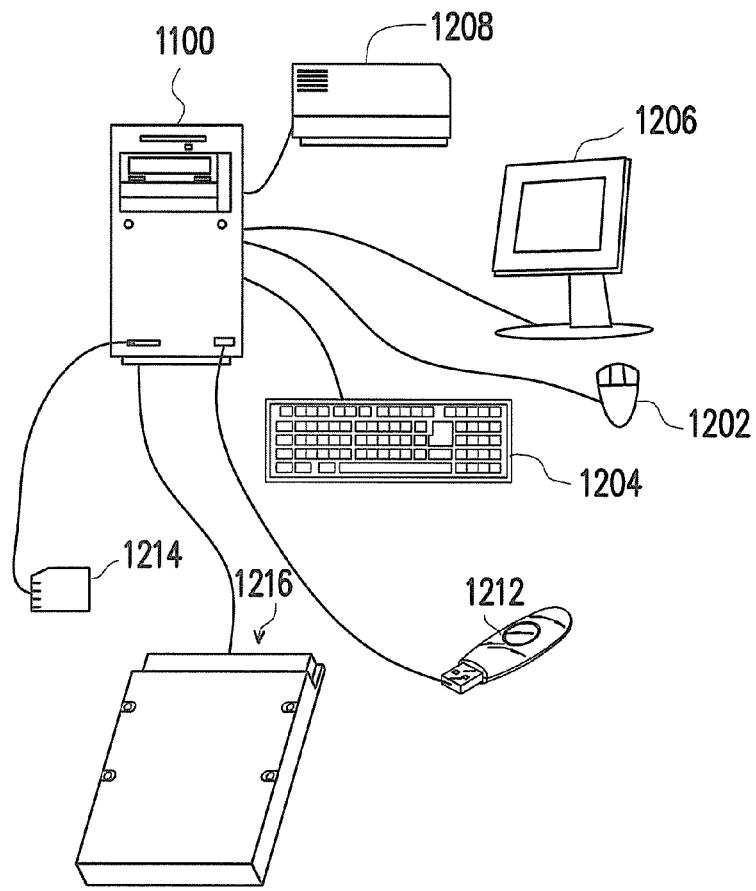
FIG. 1B is a diagram of a computer, an input/output (I/O) device, and a memory storage device according to an exemplary embodiment of the invention.

In the present embodiment, a rewritable non-volatile memory storage device 100 is coupled to other components of the host system 1000 through the data transmission interface 1110. Data can be written into or read from the rewritable non-volatile memory storage device 100 through the operations of the microprocessor 1102, the RAM 1104, and the I/O device 1106. The rewritable non-volatile memory storage device 100 may be a flash drive 1212, a memory card 1214, or a solid state drive (SSD) 1216, as shown in FIG. 1B.

Figure 1C:
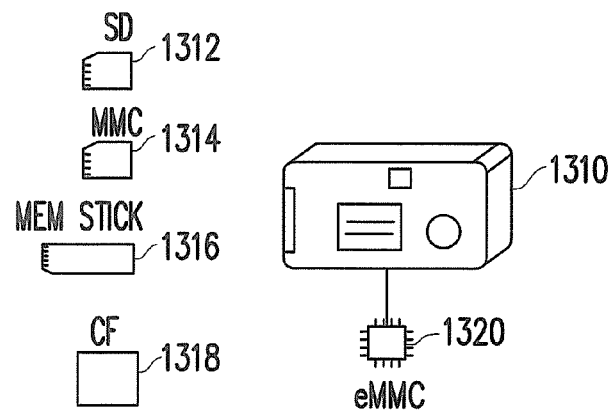
FIG. 1C is a diagram of a host system and a memory storage device according to another exemplary embodiment of the invention.

Generally, the host system 1000 may be substantially any system that can store data. Even though the host system 1000 is described as a computer system in the present exemplary embodiment, in another exemplary embodiment of the invention, the host system 1000 may also be a digital camera, a video camera, a communication device, an audio player, or a video player. For example, if the host system is a digital camera (video camera) 1310, the rewritable non-volatile memory storage device is then a secure digital (SD) card 1312, a multi media card (MMC) card 1314, a memory stick (MS) 1316, a compact flash (CF) card 1318, or an embedded storage device 1320 (as shown in FIG. 1C) used by the digital camera (video camera) 1310. The embedded storage device 1320 includes embedded MMC (eMMC). It should be mentioned that an eMMC is directly coupled to the substrate of the host system.

Figure 2:
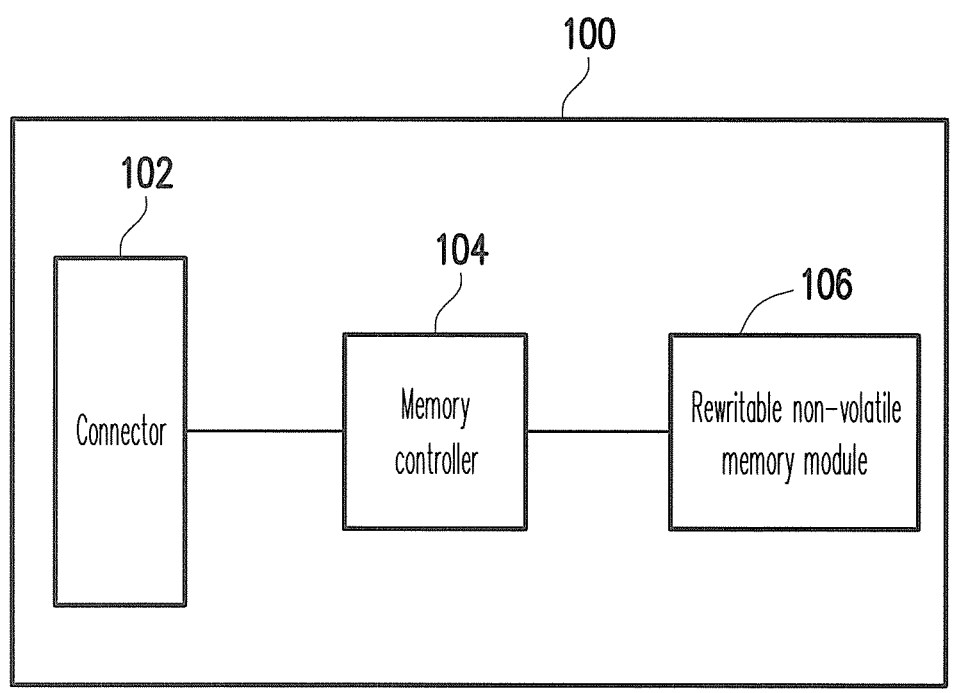
FIG. 2 is a schematic block diagram of the memory storage device in FIG. 1A.

FIG. 2 is a schematic block diagram of the memory storage device in FIG. 1A.

Referring to FIG. 2, the memory storage device 100 includes a connector 102, a memory controller 104, and a rewritable non-volatility memory module 106. In the present exemplary embodiment, the connector 102 complies with the serial advanced technology attachment (SATA) standard. However, the invention is not limited thereto, and the connector 102 may also comply with the Institute of Electrical and Electronic Engineers (IEEE) 1394 standard, the parallel advanced technology attachment (PATA) standard, the peripheral component interconnect (PCI) express standard, the universal serial bus (USB) standard, the SD interface standard, the MS interface standard, the MMC interface standard, the CF interface standard, the integrated device electronics (IDE) standard or any other suitable standard.

The memory controller 104 executes a plurality of logic gates or control instructions implemented in a hardware form or a firmware form and performs various data operations on the rewritable non-volatile memory module 106 according to commands issued by the host system 1000.

The rewritable non-volatile memory module 106 is coupled to the memory controller 104 and configured to store data written by the host system 1000. In the present exemplary embodiment, the rewritable non-volatile memory module 106 is a multi level cell (MLC) NAND flash memory module. However, the invention is not limited thereto, and the rewritable non-volatility memory module 106 may also be a single level cell (SLC) NAND flash memory module, any other rewritable non-volatility memory module, or any other memory module having the same characteristics.

Figure 3:
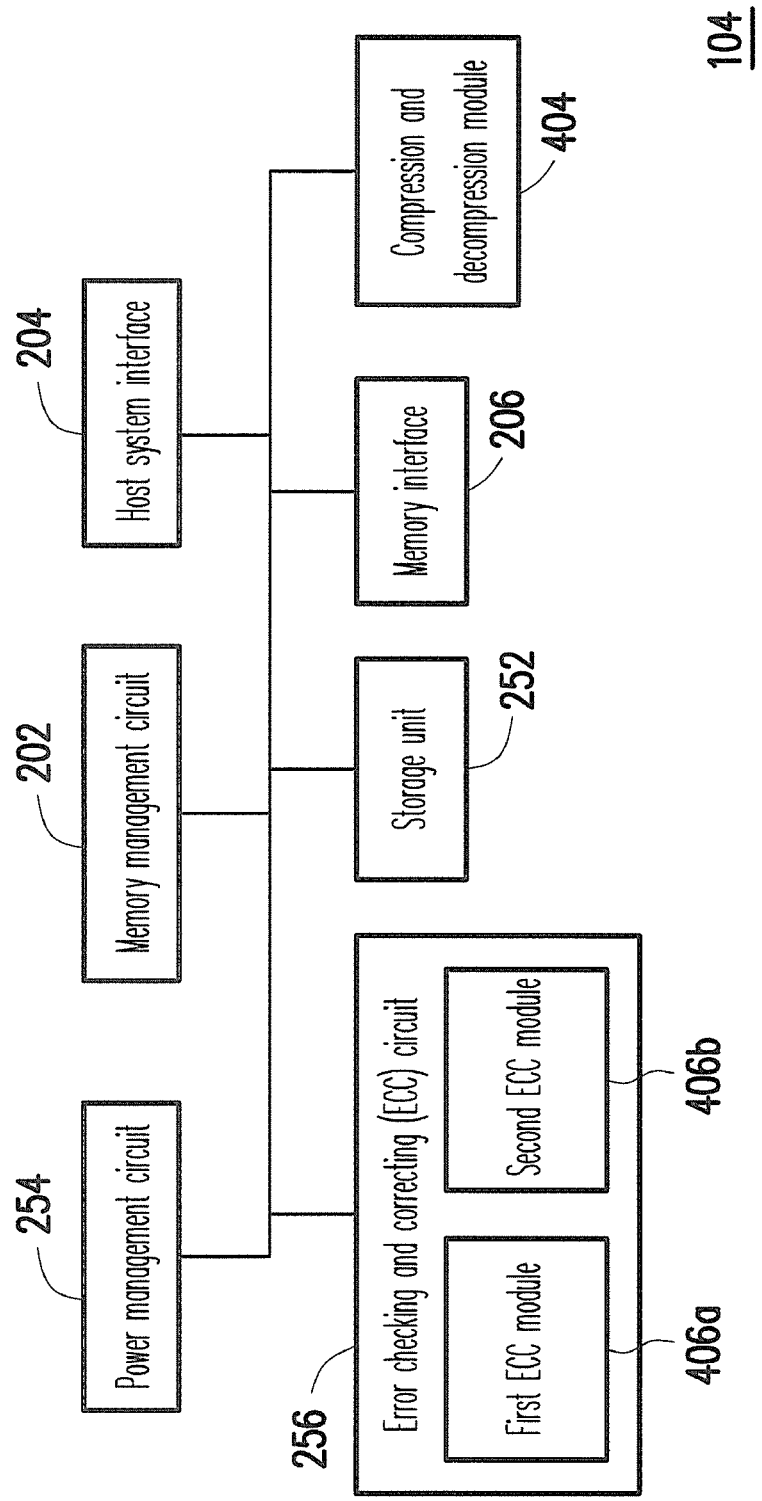
FIG. 3 is a schematic block diagram of a memory controller according to an exemplary embodiment of the invention.

FIG. 3 is a schematic block diagram of a memory controller according to an exemplary embodiment of the invention.

Referring to FIG. 3, the memory controller 104 includes a memory management circuit 202, a host system interface 204, and a memory interface 206.

The memory management circuit 202 controls the overall operation of the memory controller 104. To be specific, the memory management circuit 202 has a plurality of control instructions, and when the memory storage device 100 is in operation, the control instructions are executed to perform various data operations.

In the present exemplary embodiment, the control instructions of the memory management circuit 202 are implemented in a firmware form. For example, the memory management circuit 202 has a microprocessor unit (not shown) and a read-only memory (ROM, not shown), and these control instructions are burnt into the ROM. When the memory storage device 100 is in operation, the control instructions are executed by the microprocessor unit to perform various data operations.

In another exemplary embodiment of the invention, the control instructions of the memory management circuit 202 may also be stored in a specific area of the rewritable non-volatile memory module 106 (for example, a system area exclusively used for storing system data in a memory module) as program codes. In addition, the memory management circuit 202 has a microprocessor unit (not shown), a ROM (not shown), and a RAM (not shown). Particularly, the ROM has a boot code, and when the memory controller 104 is enabled, the microprocessor unit first executes the boot code to load the control instructions from the rewritable non-volatile memory module 106 into the RAM of the memory management circuit 202. After that, the microprocessor unit runs these control instructions to perform various data operations. Additionally, in yet another exemplary embodiment of the invention, the control instructions of the memory management circuit 202 may also be implemented in a hardware form.

The host system interface 204 is coupled to the memory management circuit 202 and configured to receive and identify commands and data issued by the host system 1000. Namely, commands and data issued by the host system 1000 are transmitted to the memory management circuit 202 through the host system interface 204. In the present exemplary embodiment, the host system interface 204 complies with the SATA standard. However, the invention is not limited thereto, and the host system interface 204 may also comply with the PATA standard, the IEEE 1394 standard, the PCI express standard, the USB standard, the SD standard, the MS standard, the MMC standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the invention, the memory controller 104 further includes a storage unit 252. The storage unit 252 is coupled to the memory management circuit 202 and configured to temporarily store data and commands from the host system 1000 or data from the rewritable non-volatility memory module 106.

In an exemplary embodiment of the invention, the memory controller 104 further includes a power management circuit 254. The power management circuit 254 is coupled to the memory management circuit 202 and configured to control the power supply of the memory storage device 100.

In an exemplary embodiment of the invention, the memory controller 104 further includes a compression and decompression module 404. The compression and decompression module 404 is configured to compress or decompress data from the host system 1000 or the rewritable non-volatile memory module 106. In the present embodiment, the compression and decompression module 404 may be an independent hardware circuit disposed in the memory controller 104. In another embodiment, the compression and decompression module 404 may be disposed in the memory management circuit 202 as a firmware.

In an exemplary embodiment of the invention, the memory controller 104 further includes an ECC circuit 256. The ECC circuit 256 is coupled to the memory management circuit 202 and configured to execute an ECC procedure to ensure data accuracy. To be specific, when the memory management circuit 202 receives a write command from the host system 1000, the ECC circuit 256 generates a corresponding ECC code for the data corresponding to the write command, and the memory management circuit 202 writes the data corresponding to the write command and the corresponding ECC code into the rewritable non-volatility memory module 106. Thereafter, when the memory management circuit 202 reads the data from the rewritable non-volatility memory module 106, it also reads the ECC code corresponding to the data, and the ECC circuit 256 executes the ECC procedure on the data according to the ECC code.

In the present exemplary embodiment, the ECC circuit 256 includes a first ECC module 406a and a second ECC module 406b. The first ECC module 406a executes a first ECC procedure to ensure the accuracy of compression information provided by the compression and decompression module 404. The second ECC module 406b executes a second ECC procedure to ensure the accuracy of data from the compression and decompression module 404 or data from the rewritable non-volatile memory module 106.

The rewritable non-volatile memory module 106 is coupled to the memory controller 104 and configured to store data written by the host system 1000. The rewritable non-volatile memory module 106 has physical blocks, wherein the physical blocks may belong to a same memory die or different memory dies. Each physical block has a plurality of physical pages, and each physical page has at least one physical sector. Physical pages belonging to the same physical block can be written individually but have to be erased all together. For example, each physical block is composed of 128 physical pages, and each physical page has 8 physical sectors. Namely, if each physical sector has a capacity of 512 bytes, then each physical page has a capacity of 4 kilobytes (KB). However, the invention is not limited thereto, and each physical block may also be composed of 64, 256, or any other number of physical pages.

To be specific, physical block is the smallest unit for erasing data. Namely, each physical block contains the least number of memory cells that are erased together. Physical page is the smallest unit for programming data. Namely, physical page is the smallest unit for writing data. However, in another exemplary embodiment of the invention, the smallest unit for writing data may also be physical sector or another unit. Each physical page usually includes a data bit area and a redundant bit area, wherein the data bit area is used for storing user data, and the redundant bit area is used for storing system data (for example, ECC codes).

It should be noted that in an exemplary embodiment of the invention, a corresponding header area is configured before the data bit area in each physical page of the rewritable non-volatile memory module 106. Herein the actual positions of the physical blocks in the rewritable non-volatile memory module 106 are not changed. Instead, the physical blocks of the rewritable non-volatile memory module 106 are logically operated. Namely, before the memory controller 104 reads a data, it first reads a compression information from the header area and executes the first ECC procedure. Then, the memory controller 104 executes the second ECC procedure on the data in the data bit area according to the compression information. Thereby, the second ECC procedure can be effectively executed. Besides the compression information corresponding to each data, an ECC code corresponding to the compression information is further stored in each header area such that the compression information can be decoded independently.

Figure 4:
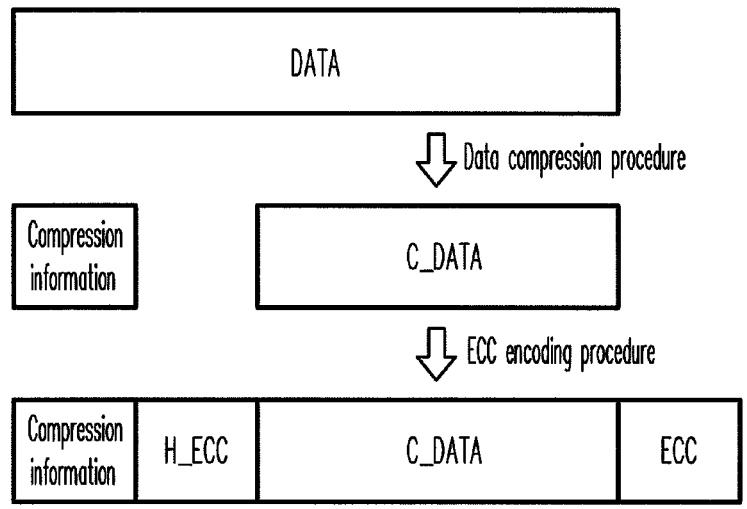
FIG. 4 is a diagram illustrating the compressing and encoding of a single data when the data is written into a rewritable non-volatile memory module 106 according to an exemplary embodiment of the invention.

FIG. 4 is a diagram illustrating the compressing and encoding of a single data when the data is written into the rewritable non-volatile memory module 106 according to an exemplary embodiment of the invention.

Referring to FIG. 3 and FIG. 4, in the present exemplary embodiment, when the memory controller 104 receives a data from the host system 1000, the compression and decompression module 404 first executes a data compression procedure on the data received from the host system 1000 to obtain a compressed data. Then, the compression and decompression module 404 provides compression information (for example, data length) corresponding to the compressed data to the first ECC module 406a.

To be specific, when the memory controller 104 is about to write the data into the rewritable non-volatile memory module 106, the first ECC module 406a generates a corresponding ECC code for the compression information and writes the compression information and the corresponding ECC code into the rewritable non-volatile memory module 106 through the memory interface 206. Meanwhile, the second ECC module 406b generates a corresponding ECC code for the compressed data received from the compression and decompression module 404 and writes the compressed data and the corresponding ECC code into the rewritable non-volatile memory module 106 through the memory interface 206.

To be specific, to write data into the rewritable non-volatile memory module 106, the memory controller 104 receives a data DATA from the host system 1000 and executes a data compression procedure on the data DATA through the compression and decompression module 404, so as to obtain a compressed data C_DATA and the compression information thereof. It should be noted that in the present exemplary embodiment, because the quantity of the compression information is very small, the compression and decompression module 404 does not to execute the data compression procedure on the compression information of the compressed data C_DATA. However, the invention is not limited thereto, and a designer can determine whether to compress the compression information according to the actual requirement.

Next, after obtaining the compression information of the compressed data C_DATA, the memory management circuit 202 respectively transmits the compressed data C_DATA and the compression information thereof to the second ECC module 406b and the first ECC module 406a. After that, the first ECC module 406a generates an ECC code H_ECC for the compression information, and meanwhile, the second ECC module 406b executes an ECC encoding procedure on the compressed data C_DATA to generate an ECC code ECC and writes the compression information, the ECC code H_ECC, the compressed data C_DATA, and the ECC code ECC corresponding to the compressed data C_DATA into the rewritable non-volatile memory module 106. It should be noted that in the present exemplary embodiment, the operations of the first ECC module 406a and the second ECC module 406b are not related to each other and can be carried out independently.

Thus, in the present exemplary embodiment, a data is compressed to obtain a compressed data and the length of the compressed data. In FIG. 4, the data C_DATA is the compressed data, and information about the data length thereof and the compressed data C_DATA are respectively ECC encoded and then written into the rewritable non-volatile memory module 106. Accordingly, the ECC code ECC is used for protecting the compressed data C_DATA (with short data length) instead of the uncompressed data DATA so that the protection capability of the ECC code ECC is improved.

Figure 5:
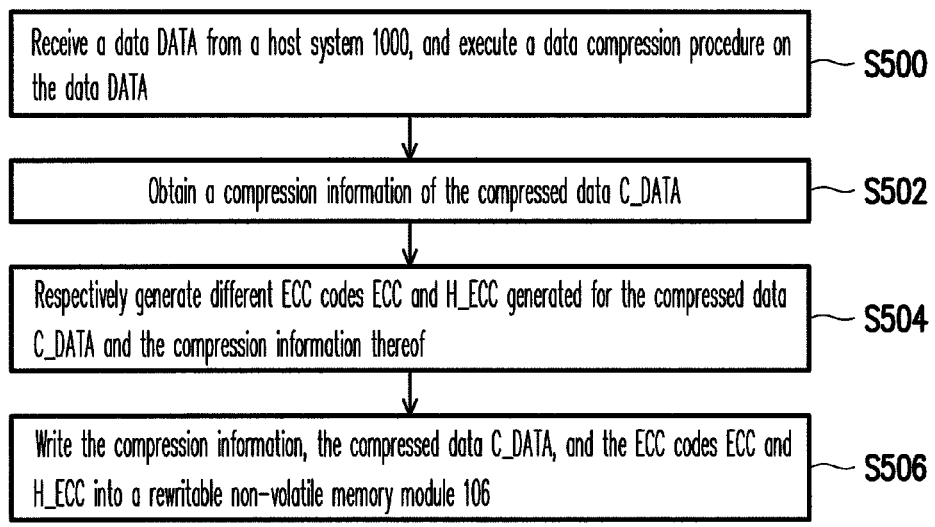
FIG. 5 is a flowchart illustrating how a data is written into the rewritable non-volatile memory module 106 according to an exemplary embodiment of the invention.

Foregoing data writing method will be described below. FIG. 5 is a flowchart illustrating how a data is written into the rewritable non-volatile memory module 106 according to an exemplary embodiment of the invention.

Referring to FIG. 5, first, in step S500, a data DATA to be written is received from the host system 1000, and a data compression procedure is executed on the data DATA to obtain a compressed data C_DATA. Then, in step S502, a compression information of the compressed data C_DATA is obtained. Next, in step S504, different ECC codes ECC and H_ECC are respectively generated for the compressed data C_DATA and the compression information thereof. After that, in step S506, the compression information, the compressed data C_DATA, and the ECC codes ECC and H_ECC are written into the rewritable non-volatile memory module 106.

The data writing method provided by the present exemplary embodiment can be well understood and implemented by referring to the descriptions related to the embodiments illustrated in FIG. 3 and FIG. 4 therefore will not be further described herein.

Figure 6:
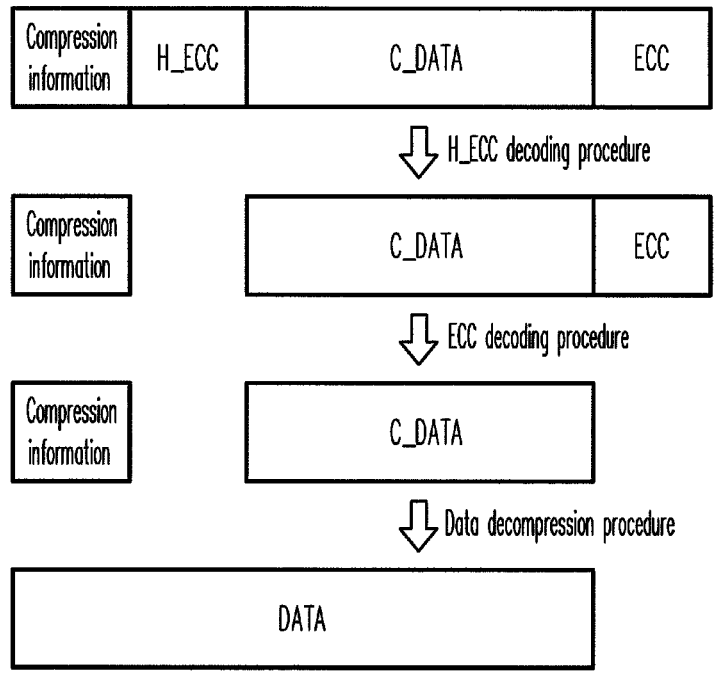
FIG. 6 is a diagram illustrating the decompressing and decoding of a single data when the data is read from the rewritable non-volatile memory module 106 according to an exemplary embodiment of the invention.

FIG. 6 is a diagram illustrating the decompressing and decoding of a single data when the data is read from the rewritable non-volatile memory module 106 according to an exemplary embodiment of the invention.

Referring to FIG. 3 and FIG. 6, when the memory controller 104 is about to read a data from the rewritable non-volatile memory module 106, the first ECC module 406a executes a first ECC procedure on the compression information according to the ECC code corresponding to the compression information, so as to obtain a storage state of the compression information when the compression information is written. Meanwhile, the second ECC module 406b executes a second ECC procedure on the compressed data according to the storage state of the compression information when the compression information is written and the ECC code corresponding to the compressed data, so as to obtain a storage state of the compressed data when the compressed data is written.

To be specific, while reading data from the rewritable non-volatile memory module 106, the memory management circuit 202 respectively reads the compression information, the compressed data C_DATA, and the ECC codes ECC and H_ECC from the rewritable non-volatile memory module 106. Then, after reading the compression information, the compressed data C_DATA, and the ECC codes ECC and H_ECC, the memory management circuit 202 respectively transmits the compression information and the ECC code H_ECC to the first ECC module 406a and transmits the compressed data C_DATA and the ECC code ECC to the second ECC module 406b. After that, the first ECC module 406a executes an ECC procedure (for example, a decoding procedure according to the ECC code H_ECC) on the compression information according to the ECC code H_ECC corresponding to the compression information, so as to obtain a storage state of the compression information when the compression information is written. Meanwhile, the second ECC module 406b executes an ECC procedure (for example, a decoding procedure according to the ECC code ECC) on the compressed data C_DATA according to the storage state of the compression information when the compression information is written and the ECC code ECC corresponding to the compressed data C_DATA, so as to obtain a storage state of the compressed data C_DATA when the compressed data C_DATA is written. Thereafter, the compression and decompression module 404 executes a data decompression procedure on the corrected compressed data C_DATA to obtain the original data DATA.

In the present exemplary embodiment, the compression information has a small data quantity therefore can be quickly decoded and corrected to obtain an accurate compression information. After obtaining the compression information, the ECC procedure of the compressed data C_DATA can be correctly executed, and accordingly an accurate compressed data C_DATA and the original DATA can be obtained.

On the other hand, in the present exemplary embodiment, the ECC circuit 256 includes the first ECC module 406a and the second ECC module 406b. The two ECC modules respectively generate ECC codes for the compression information and the compressed data C_DATA and execute the first ECC procedure and the second ECC procedure. However, the invention is not limited thereto, and in another exemplary embodiment, the ECC circuit 256 may also generate ECC codes for the compression information and the compressed data C_DATA and execute the first ECC procedure and the second ECC procedure by using a single ECC module.

Figure 7:
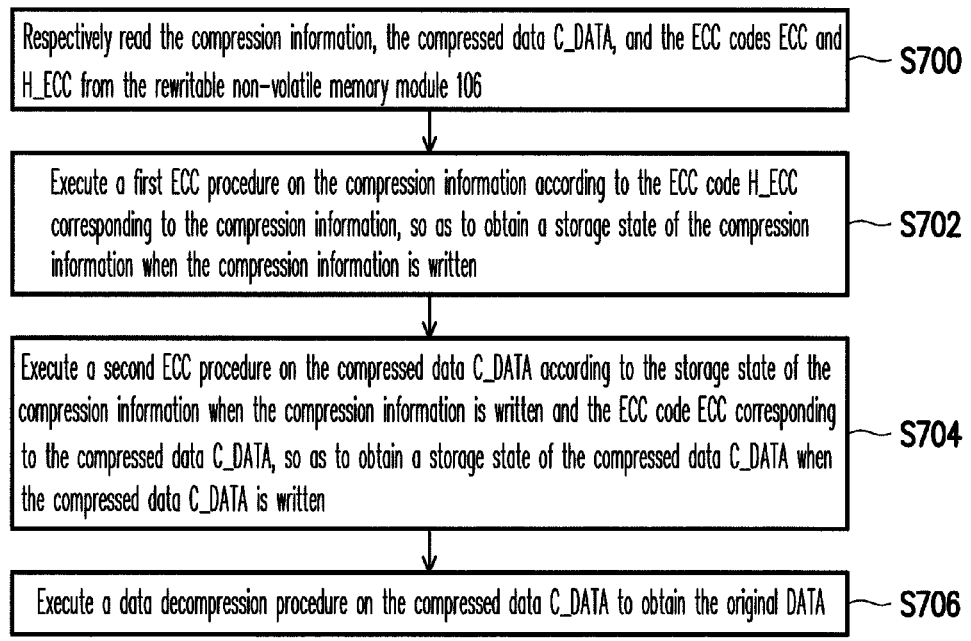
FIG. 7 is a flowchart illustrating how a data is read from the rewritable non-volatile memory module 106 according to an exemplary embodiment of the invention.

Foregoing data reading method will be described below. FIG. 7 is a flowchart illustrating how a data is read from the rewritable non-volatile memory module 106 according to an exemplary embodiment of the invention.

Referring to FIG. 7, first, in step S700, the compression information, the compressed data C_DATA, and the ECC codes ECC and H_ECC are respectively read from the rewritable non-volatile memory module 106. Then, in step S702, an ECC procedure is executed on the compression information according to the ECC code H_ECC corresponding to the compression information, so as to obtain a storage state of the compression information when the compression information is written. Next, in step S704, an ECC procedure is executed on the compressed data C_DATA according to the storage state of the compression information when the compression information is written and the ECC code ECC corresponding to the compressed data C_DATA, so as to obtain a storage state of the compressed data C_DATA when the compressed data C_DATA is written. After that, in step S706, a data decompression procedure is executed on the compressed data C_DATA to obtain the original DATA.

The data writing method provided by the present exemplary embodiment can be well understood and implemented by referring to the descriptions related to the embodiments illustrated in FIG. 3 and FIG. 6 therefore will not be further described herein.

Figure 8:
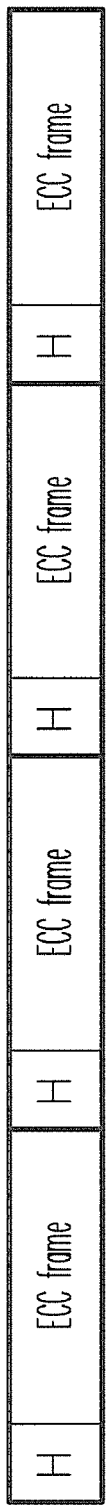
FIG. 8 is a diagram illustrating a data format of the rewritable non-volatile memory module 106 according to an exemplary embodiment of the invention.

FIG. 8 is a diagram illustrating a data format of the rewritable non-volatile memory module 106 according to an exemplary embodiment of the invention, wherein the data format of a physical page is illustrated. In the present exemplary embodiment, each physical page logically includes a plurality of header areas H and a plurality of ECC frames. Besides, in each physical page, each header area H is configured before the corresponding ECC frame, as shown in FIG. 8. Each header area H stores the compression information of the corresponding compressed data C_DATA and the ECC code H_ECC corresponding to the compression information, and each ECC frame stores the compressed data C_DATA and the corresponding ECC code ECC.

Thus, in the present exemplary embodiment, the memory management circuit 202 writes compression information and the ECC code H_ECC corresponding to the compression information into the header areas H and writes the compressed data C_DATA and the corresponding ECC code ECC after the header areas H as ECC frames. In other words, step S506 in FIG. 5 may further include writing the compression information and the corresponding ECC code H_ECC into the header areas H and writing the compressed data C_DATA and the corresponding ECC code ECC after the header areas H as ECC frames.

It should be noted that the terms "before" and "after" are only used herein as reference to FIG. 8 but not intended to limit a data format in the invention. Additionally, in a data format of the invention, the header areas do not have to be configured before the corresponding ECC frames, and the header areas may also be configured at the beginning of a physical page.

Figure 9:
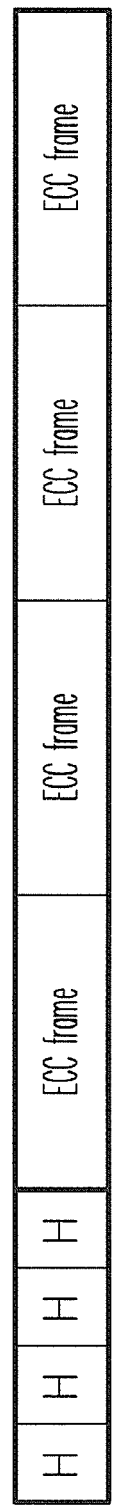
FIG. 9 is a diagram illustrating a data format of the rewritable non-volatile memory module 106 according to another exemplary embodiment of the invention.

FIG. 9 is a diagram illustrating a data format of the rewritable non-volatile memory module 106 according to another exemplary embodiment of the invention. Referring to FIG. 9, in the data format of the present exemplary embodiment, all the header areas H are configured at the beginning of a physical page (i.e., the starting address of the physical page). Besides, in the present exemplary embodiment, besides the compression information of the corresponding compressed data C_DATA and the ECC code H_ECC corresponding to the compression information, each header area H further store firmware-related information of each redundant bit area (not shown). An advantage of such a configuration is that data stored in the header areas H can be read and decoded individually. When a firmware requires only information of the redundant bit area, the information alone can be read and decoded. Besides, since the quantity of the information is very small, the ECC decoding process only takes a short time. Thereby, compared to the conventional data format, the data format in the invention allows a firmware to obtain information related to the redundant bit area in a shorter time.

Figure 10:
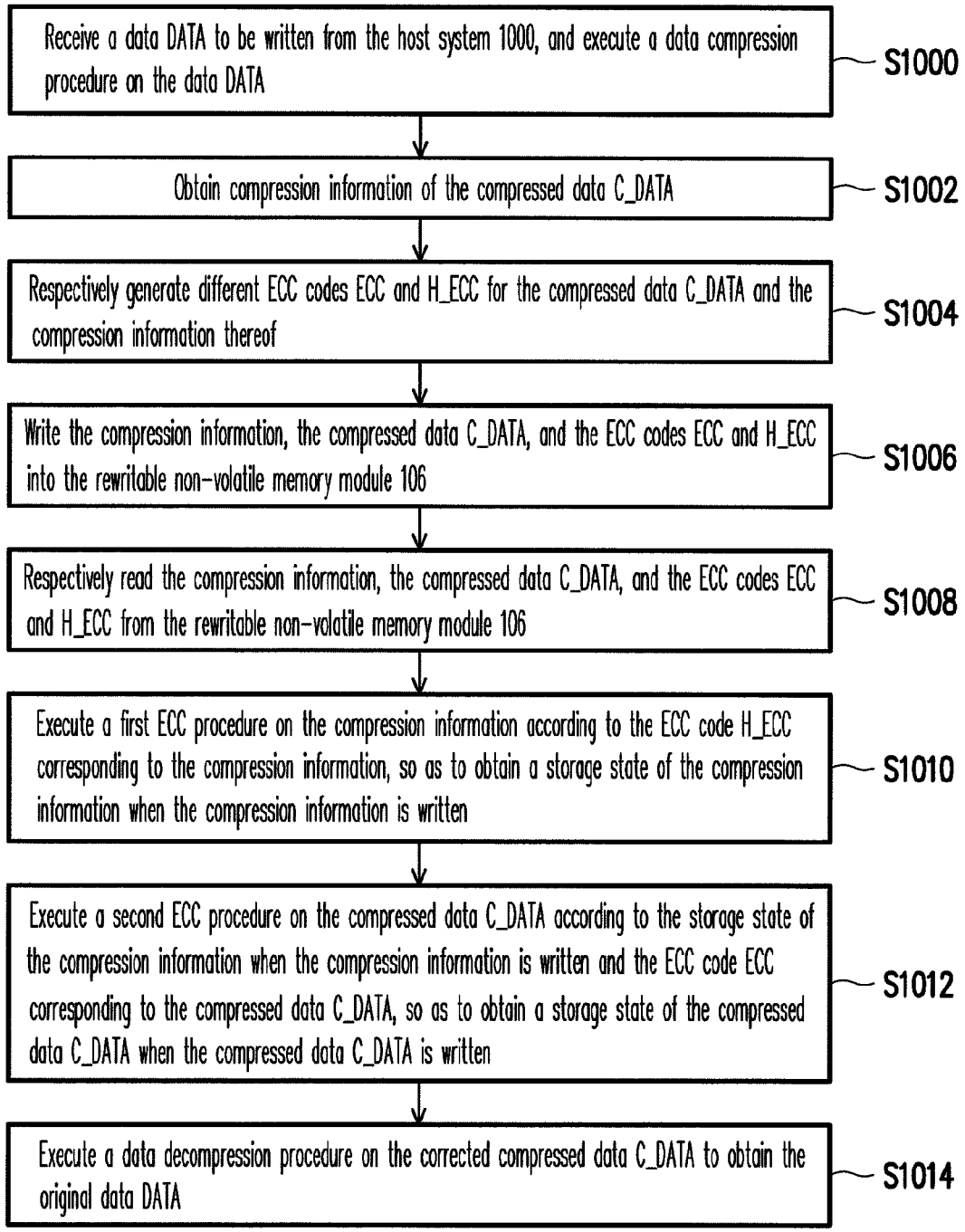
FIG. 10 is a flowchart of a data processing method according to an exemplary embodiment of the invention.

FIG. 10 is a flowchart of a data processing method according to an exemplary embodiment of the invention.

Referring to FIG. 10, first, in step S1000, a data DATA to be written is received from the host system 1000, and a data compression procedure is executed on the data DATA to obtain a compressed data C_DATA. Then, in step S1002, compression information of the compressed data C_DATA is obtained. Next, in step S1004, different ECC codes ECC and H_ECC are respectively generated for the compressed data C_DATA and the compression information thereof. After that, in step S1006, the compression information, the compressed data C_DATA, and the ECC codes ECC and H_ECC are written into the rewritable non-volatile memory module 106. In other words, step S1006 in FIG. 10 further includes writing the compression information and the corresponding ECC code H_ECC into the header areas H and writing the compressed data C_DATA and the corresponding ECC code ECC after the header areas H as ECC frames.

Next, in step S1008, the compression information, the compressed data C_DATA, and the ECC codes ECC and H_ECC are respectively read from the rewritable non-volatile memory module 106. After that, in step S1010, an ECC procedure is executed on the compression information according to the ECC code H_ECC corresponding to the compression information, so as to obtain a storage state of the compression information when the compression information is written. Then, in step S1012, an ECC procedure is executed on the compressed data C_DATA according to the storage state of the compression information when the compression information is written and the ECC code ECC corresponding to the compressed data C_DATA, so as to obtain a storage state of the compressed data C_DATA when the compressed data C_DATA is written. Next, in step S1014, a data decompression procedure is executed on the corrected compressed data C_DATA to obtain the original data DATA.

The data processing method provided by the present embodiment can be well understood and implemented by referring to the descriptions related to the embodiments illustrated in FIG. 1A to FIG. 9 therefore will not be further described herein.

As described above, the data processing method provided by an exemplary embodiment of the invention is adapted to a memory storage device having an unconventional data format. Before reading a data, the memory controller can first read its compression information and then execute an ECC procedure on the compressed data according to the compression information, so as to ensure that the ECC procedure can be effectively executed.

The previously described exemplary embodiments of the present invention have many advantages, including ensuring that the ECC procedure can be effectively executed, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data processing method, adapted to a rewritable non-volatile memory module, the data processing method comprising:
   compressing at least one data to obtain at least one compressed data;
   obtaining at least one compression information corresponding to the at least one compressed data;
   respectively generating error checking and correcting (ECC) codes for the at least one compression information and the at least one compressed data; and
   respectively writing the at least one compression information, the at least one compressed data, and the ECC codes into the rewritable non-volatile memory module.

2. The data processing method according to claim 1 further comprising:
   respectively reading the at least one compression information, the at least one compressed data, and the ECC codes from the rewritable non-volatile memory module;
   executing a first ECC procedure on the at least one compression information according to the ECC code corresponding to the at least one compression information, so as to obtain a storage state of the at least one compression information when the at least one compression information is written;
   executing a second ECC procedure on the at least one compressed data according to the storage state of the at least one compression information when the at least one compression information is written and the ECC code corresponding to the at least one compressed data, so as to obtain a storage state of the at least one compressed data when the at least one compressed data is written; and
   after executing the second ECC procedure on the at least one compressed data, executing a data decompression procedure on the at least one compressed data to obtain the original data.

3. The data processing method according to claim 1, wherein the step of compressing the at least one data to obtain the at least one compressed data comprises:
   receiving the data from a host system, and executing a data compression procedure on the at least one data to obtain the at least one compressed data.

4. The data processing method according to claim 1, wherein the rewritable non-volatile memory module comprises a plurality of physical blocks, each of the physical blocks comprises a plurality of physical pages, and each of the physical pages comprises a plurality of header areas and a plurality of ECC frames, wherein the ECC frames are configured after the header areas, and the step of writing the at least one compression information, the at least one compressed data, and the ECC codes into the rewritable non-volatile memory module comprises:
   writing the at least one compression information and the ECC code corresponding to the at least one compression information into the header areas.

5. The data processing method according to claim 4, wherein the step of writing the at least one compression information, the at least one compressed data, and the ECC codes into the rewritable non-volatile memory module further comprises:
   writing the at least one compressed data and the ECC code corresponding to the at least one compressed data into the ECC frames.

6. The data processing method according to claim 4, wherein in each of the physical pages, the header areas are all configured before the ECC frames, and a firmware information is further stored in the header areas.

7. The data processing method according to claim 1, wherein the at least one compression information comprises a data length information of the at least one compressed data.

8. A memory controller, comprising:
   a host system interface, configured to couple to a host system;
   a memory interface, configured to couple to a rewritable non-volatile memory module;
   a compression and decompression module, coupled to a memory management circuit, compressing at least one data to obtain at least one compressed data and at least one compression information corresponding to the at least one compressed data;

an ECC circuit, coupled to the memory management circuit, respectively generating ECC codes for the at least one compression information and the at least one compressed data; and the memory management circuit, coupled to the host system interface and the memory interface, writing the at least one compression information, the at least one compressed data, and the ECC codes corresponding to the at least one compression information and the at least one compressed data into the rewritable non-volatile memory module.

9. The memory controller according to claim 8, wherein the memory management circuit respectively reads the at least one compression information, the at least one compressed data, and the ECC codes corresponding to the at least one compression information and the at least one compressed data from the rewritable non-volatile memory module;

the ECC circuit executes a first ECC procedure on the at least one compression information according to the ECC code corresponding to the at least one compression information, so as to obtain a storage state of the at least one compression information when the at least one compression information is written, and the ECC circuit executes a second ECC procedure on the at least one compressed data according to the storage state of the at least one compression information when the at least one compression information is written and the ECC code corresponding to the at least one compressed data, so as to obtain a storage state of the at least one compressed data when the at least one compressed data is written; and after the ECC circuit executes the second ECC procedure on the at least one compressed data, the compression and decompression module executes a data decompression procedure on the at least one compressed data to obtain the original data.

10. The memory controller according to claim 9, wherein the ECC circuit comprises:
a first ECC module, coupled to the memory management circuit, executing the first ECC procedure on the at least one compression information according to the ECC code corresponding to the at least one compression information, so as to obtain the storage state of the at least one compression information when the at least one compression information is written; and
a second ECC module, coupled to the memory management circuit, executing the second ECC procedure on the at least one compressed data according to the storage state of the at least one compression information when the at least one compression information is written and the ECC code corresponding to the at least one compressed data, so as to obtain the storage state of the at least one compressed data when the at least one compressed data is written.

11. The memory controller according to claim 8, wherein the rewritable non-volatile memory module comprises a plurality of physical blocks, each of the physical blocks comprises a plurality of physical pages, and each of the physical pages comprises a plurality of header areas and a plurality of ECC frames, wherein the ECC frames are configured after the header areas, and the memory management circuit writes the at least one compression information and the ECC code corresponding to the at least one compression information into the header areas.

12. The memory controller according to claim 11, wherein the memory management circuit writes the at least one compressed data and the ECC code corresponding to the at least one compressed data into the ECC frames.

13. The memory controller according to claim 11, wherein in each of the physical pages, the header areas are all configured before the ECC frames, and a firmware information is further stored in the header areas.

14. The memory controller according to claim 8, wherein the at least one compression information comprises a data length information of the at least one compressed data.

15. A memory storage device, comprising:
a connector, configured to couple to a host system;
a rewritable non-volatile memory module; and
a memory controller, coupled to the connector and the rewritable non-volatile memory module, compressing at least one data to obtain at least one compressed data and at least one compression information corresponding to the at least one compressed data, respectively generating ECC codes for the at least one compression information and the at least one compressed data, and writing the at least one compression information, the at least one compressed data, and the ECC codes corresponding to the at least one compression information and the at least one compressed data into the rewritable non-volatile memory module.

16. The memory storage device according to claim 15, wherein the memory controller respectively reads the at least one compression information, the at least one compressed data, and the ECC codes corresponding to the at least one compression information and the at least one compressed data from the rewritable non-volatile memory module, the memory controller executes a first ECC procedure on the at least one compression information according to the ECC code corresponding to the at least one compression information, so as to obtain a storage state of the at least one compression information when the at least one compression information is written, the memory controller executes a second ECC procedure on the at least one compressed data according to the storage state of the at least one compression information when the at least one compression information is written and the ECC code corresponding to the at least one compressed data, so as to obtain a storage state of the at least one compressed data when the at least one compressed data is written, and after executing the second ECC procedure on the at least one compressed data, the memory controller executes a data decompression procedure on the at least one compressed data to obtain the original data.

17. The memory storage device according to claim 15, wherein the rewritable non-volatile memory module comprises a plurality of physical blocks, each of the physical blocks comprises a plurality of physical pages, and each of the physical pages comprises a plurality of header areas and a plurality of ECC frames, wherein the ECC frames are configured after the header areas, and the memory controller writes the at least one compression information and the ECC code corresponding to the at least one compression information into the header areas.

18. The memory storage device according to claim 17, wherein the memory controller writes the at least one compressed data and the ECC code corresponding to the at least one compressed data into the ECC frames.

19. The memory storage device according to claim 17, wherein in each of the physical pages, the header areas are all configured before the ECC frames, and a firmware information is further stored in the header areas.

20. The memory storage device according to claim 15, wherein the at least one compression information comprises a data length information of the at least one compressed data.

* * * * *